United States Patent
Ono et al.

(10) Patent No.: US 6,884,367 B2
(45) Date of Patent: Apr. 26, 2005

(54) METHOD FOR PRODUCING SILICATE PHOSPHOR

(75) Inventors: Keiji Ono, Tsukuba (JP); Takashi Takeda, Sapporo (JP); Susumu Miyazaki, Kitasoma-gun (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 10/318,146

(22) Filed: Dec. 13, 2002

(65) Prior Publication Data

US 2003/0111643 A1 Jun. 19, 2003

(30) Foreign Application Priority Data

Dec. 19, 2001 (JP) .......................................... 2001-385832
May 31, 2002 (JP) .......................................... 2002-158909

(51) Int. Cl.$^7$ .......................... C09K 11/59; C09K 11/55; H01J 9/22
(52) U.S. Cl. ........................... 252/301.4 F; 252/301.6 F
(58) Field of Search ..................... 252/301.4 F, 301.6 F

(56) References Cited

U.S. PATENT DOCUMENTS

| 4,234,528 | A | * | 11/1980 | Nussbaumer et al. | ......... 264/41 |
| 4,547,546 | A | * | 10/1985 | Wells | .......... 524/313 |
| 4,892,757 | A | * | 1/1990 | Kasenga et al. | ............ 427/215 |
| 5,098,938 | A | * | 3/1992 | Savin | ........... 523/220 |
| 6,495,114 | B1 | * | 12/2002 | Debras | ......... 423/337 |
| 2002/0038861 | A1 | | 4/2002 | Toda et al. | |

FOREIGN PATENT DOCUMENTS

| JP | 9-316444 A | 12/1997 |
| JP | 2002-332481 A | 11/2002 |

* cited by examiner

Primary Examiner—C. Melissa Koslow
(74) Attorney, Agent, or Firm—Sughrue Mion, PLLC

(57) ABSTRACT

The object of the present invention is to provide a production method for a silicate phosphor having high brightness. This object is achieved by the method for producing a silicate phosphor comprising a step of calcining a mixture of metal compounds, wherein one of the metal compounds is silicon oxide having BET specific surface area of not less than 10 $m^2/g$.

8 Claims, No Drawings

METHOD FOR PRODUCING SILICATE PHOSPHOR

FIELD OF THE INVENTION

The present invention relates to a method for producing a silicate phosphor, and specifically relates to a method for producing a silicate phosphor suitable for a vacuum ultraviolet excitation light emitting element such as a plasma display panel (PDP) and a rare gas lamp.

BACKGROUND OF THE INVENTION

Silicate phosphor is used for a fluorescent, a cathode-ray tube, a luminous body, a vacuum ultraviolet excitation light emitting element and the like. Specifically, for a vacuum ultraviolet excitation light emitting element such as PDP, an improvement of the brightness of the element has been highly desired, and therefore, an improvement of the brightness of the silicate phosphor has been required.

A silicate phosphor is conventionally produced by calcining a mixture of metal compounds, and silicon oxide is used as a metal compound for a source of silicon. One of the examples of the method for producing a silicate phosphor is described in JP No. 09-316444A. According to this method, a silicate phosphor for electron beam excitation represented by a composition formula of $Y_{1.84}Tb_{0.14}SiO_5$ is produced by mixing yttrium oxide, terbium oxide and silicon oxide and calcining the obtained mixture at 1580° C. for 4 hours under reductive atmosphere, wherein the particle diameter of the used silicon oxide calculated from specific surface area is 0.5 $\mu$m (5.5 $m^2/g$ as converted to specific surface area). However, a production method for a silicate phosphor having higher brightness has been still required.

The object of the present invention is to provide a method for producing a silicate phosphor having high brightness and the silicate phosphor produced by the method.

The present inventors have conducted intensive studies in a method for producing a silicate phosphor by calcining a mixture of metal compounds and directed their attention to the characteristics of silicate raw material as a powder. As a result, the present inventors have found that a silicate phosphor having higher brightness can be produced by using silicon oxide having BET specific surface area of not less than 10 $m^2/g$, which resulted in the completion of the present invention.

SUMMARY OF THE INVENTION

Namely, the present invention provides a method for producing a silicate phosphor comprising a step of calcining a mixture of metal compounds, wherein one of the metal compounds is silicon oxide having BET specific surface area of not less than 10 $m^2/g$. The present invention also provides the above-mentioned method wherein the mixture of metal compounds is a mixture of silicon oxide and compound(s) of one or more metal(s) selected from the group consisting of Ca, Sr, Ba, Mg, Eu, Mn and Zn. The present invention further provides the above-mentioned methods wherein the silicate phosphor comprises a compound represented by the general formula of $mM^1O.nM^2O.2SiO_2$ (wherein $M^1$ is one or more elements selected from the group consisting of Ca, Sr and Ba, $M^2$ is one or more elements selected from the group consisting of Mg and Zn, m is from 0.5 to 3.5, and n is from 0.5 to 2.5), and one or more selected from the group consisting of Eu and Mn as an activating agent. The present invention additionally provides a silicate phosphor obtained by any of the above-mentioned methods, containing not less than 80% by weight particle having a primary particle diameter of not more than 5 $\mu$m.

DETAILED DESCRIPTION OF THE INVENTION

Hereinafter the present invention is explained in more detail.

The method for producing a silicate phosphor of the present invention is a method comprising a step of calcining a mixture of metal compounds which is capable to produce a silicate phosphor by calcining, wherein one of metal compounds is silicon oxide having BET specific surface area of not less than 10 $m^2/g$. When the BET specific surface area of silicon oxide is less than 10 $m^2/g$, a silicate phosphor having high brightness may not be obtained. The BET specific surface area is preferably not less than 100 $m^2/g$, and more preferably not less than 200 $m^2/g$.

While the upper limit of the BET specific area is not particularly restricted and usually the BET specific area is preferably not more than 400 $m^2/g$, when a spherical silicon oxide is used, the upper limit of the BET specific area is preferably not more than 50 $m^2/g$, more preferably not more than 30 $m^2/g$. In the present invention, above spherical silicon oxide means that the ratio of longest diameter of a particle of a silicon oxide to its shortest diameter (longest diameter/shortest diameter) is preferably not more than 1.5, and more preferably not more than 1.3. When a particle of silicon oxide is completely sphere, the ratio of longest diameter to shortest diameter is 1. Longest diameter and shortest diameter of a particle of silicon oxide is determined with a photograph of the phosphor particle by electron micrograph.

Although the reason why the silicate phosphor having high brightness is obtained by using the silicon oxide having BET specific surface area of not less than 10 $m^2/g$ is not clear, the cause of deterioration of the emission brightness is supposed that the metal elements constituting phosphor, especially activation agent(s), may not be uniform. When particle of silicon oxide having BET specific surface area of not less than 10 $m^2/g$ is used, it results in making the composition distribution of metal elements in the silicate phosphor uniform.

The metal compounds used in the present invention also include a compound of a metal element used as an activating agent.

For example, when preparing $CaMgSi_2O_6$:Eu, which is a blue phosphor, a compound of Ca, Ba, Mg and Eu which is capable to produce $CaMgSi_2O_6$:Eu by calcining and silicon oxide having BET specific surface area of not less than 10 $m^2/g$ is used as raw materials, and other compound of Si than silicon oxide may be further added.

The method of the present invention is preferably applied when the mixture of the metal compounds is the mixture of compounds of one or more metal elements selected from the group consisting of Ca, Sr, Ba, Mg, Eu, Mn and Zn, and silicon compound. The method of the present invention is more prefereably applied to the production of a silicate phosphor comprising a compound represented by the general formula $mM^1O.nM^2O.2SiO_2$ (wherein $M^1$ is one or more elements selected from Ca, Sr and Ba, $M^2$ is one or more elements selected from Mg and Zn, m is from 0.5 to 3.5, and n is from 0.5 to 2.5), and one or more elements selected from Eu and Mn as an activating agent. When m is less than 0.5 or more than 3.5, or n is less than 0.5 or more than 2.5, a silicate phosphor having high luminescence may not be obtained.

In the method of the present invention, the metal compounds, besides silicon oxide, used for one of the mixture of the metal compounds include compounds which is decomposed and convert to oxides at high temperature, such as hydroxide, carbonate, nitrate, halogenate, oxalate and the like of metal elements constituting the silicate phosphor, or oxide of the metal elements. These metal compounds may be obtained by the conventional technique.

In the method of the present invention, the mixture of the metal compounds can be obtained by mixing each of the metal compounds by a mixing method which is industrially used in general. Either of dry or wet mixing method may be applied. A mixing apparatus for the dry mixing method may be an apparatus such as a ball mill, a V-mixer, a stirrer and the like. The wet mixing may be carried out by adding water or an organic solvent and using a ball mill or a stirrer.

When the wet mixing is carried out, the obtained mixture is directly dried or after separating solid from liquid by a method such as filtration, centrifugation and the like. The drying temperature is preferably in the range of 20 to 300° C., and more preferably 90 to 200° C. When the mixture is directly dried, the method of drying include evaporation and spray drying in which drying is carried out while granulating.

In the production method of the present invention, the temperature as the maximum achievable temperature for calcining the mixture of the metal compounds is preferably in the range of from 1000° C. to 1400° C. During calcining, the time for maintaining the temperature in the range of from 1000° C. to 1400° C. is preferably from 0.5 to 50 hours. When the mixture of the metal compounds contains compounds which is decomposed and convert to oxides at high temperature, such as hydroxide, carbonate, nitrate, halogenate, oxalate of metal elements, the mixture may be subjected to pre-calcination at the temperature range of 600° C. to 900° C. prior to calcining. In the step of clacining, for example, the raw materials may be filled in an alumina boat and calcined under atmosphere of desired gas composition and at the prescribed temperature. Furthermore, a flux such as boron oxide, aluminum fluoride and the like is optionally added to the raw materials in order to promote calcination, thereby a silicate phosphor having higher crystallinity and higher brightness may be obtained.

For example, when the raw materials of the metal compounds are weighed, mixed and calcined so as to obtain a phosphor compound represented by the composition formula of $CaMgSi_2O_6$:Eu, which is a blue phosphor, the mixture of the raw materials of the metal compounds can be calcined once or more in reductive atmosphere, at the temperature range of 1000° C. to 1400° C. and for 0.5 to 40 hours. The method of calcining under reductive atmosphere includes a method of calcining under the mixed atmosphere of nitrogen and hydrogen, or the mixed atmosphere of rare gas and hydrogen. These atmospheres may include water vapor. The mixture can be calcined again under the reductive atmosphere at the temperature range of 1000° C. to 1400° C., after calcined under the atmosphere of air at the temperature range of 1000° C. to 1400° C.

The phosphor obtained by the above-mentioned method may be crushed by using a ball mill, a jet mill and the like, or may be washed with water and the like. The phosphor may be classified. Re-calcining may be carried out in order to improve the crystallinity of the obtained phosphor. The aggregation state of the primary particle of the silicate phosphor obtained by the method of the present invention is weaker than that of the phosphor obtained by known method, thereby the post-treatment such as crushing may be omitted.

The silicate phosphor obtained by the method of the present invention contains not less than 80% by weight particle having primary particle diameter of not more than 5 $\mu$m, and the primary particle diameter is sometimes smaller than that of the silicate phosphor obtained by the known method. Since the primary particle diameter of the phosphor is effectively reduced, the phosphor produced by the method of the present invention can be applied effectively over inner surface of a micro-discharge space of a display cell of a PDP, and the production of emission-type display such as PDP having high emission brightness can be produced. Furthermore, it is likely due to the uniform composition distribution of metal elements in the phosphor, resulting in that the silicate phosphor obtained by the method of the present invention has high color purity.

As the silicate phosphor obtained by the method of the present invention has high brightness under vacuum ultraviolet excitation, it is preferable for a vacuum ultraviolet excitation light emitting element such as PDP, rare gas lamp and the like. Furthermore, the silicate phosphor obtained by the method of the present invention shows excellent emission properties not only under vacuum ultraviolet excitation, but also under ultraviolet, cathod ray or X-ray excitation.

EXAMPLES

Hereinafter the present invention is explained in detail by referring to Example, and the present invention is not limited to the Example.

Example 1

Using silicon oxide ($SiO_2$) having BET specific surface area of 210 $m^2/g$ (manufactured by Wako Pure Chemical Industries, Ltd., catalog No. 192-09071), raw materials of calcium carbonate ($CaCO_3$, manufactured by Wako Pure Chemical Industries, Ltd.), strontium carbonate ($SrCO_3$, manufactured by Wako Pure Chemical Industries, Ltd.), europium oxide ($Eu_2O_3$, manufactured by Shin-Etsu Chemical Co., Ltd.), basic magnesium carbonate (($MgCO_3)_4Mg(OH)_2 \cdot 5H_2O$, (manufactured by Wako Pure Chemical Industries, Ltd.) and above $SiO_2$ were mixed so that the mole ratio of $CaCO_3$:$SrCO_3$:$Eu_2O_3$:$(MgCO_3)_4Mg(OH)_2 \cdot 5H_2O$:$SiO_2$ was 0.855:0.095:0.025:0.2:2, and the resulted mixture was calcined under Ar atmosphere containing 2% by volume $H_2$, at 1200° C. for 2 hours. A phosphor compound represented by the composition formula $Ca_{0.855}Sr_{0.095}Eu_{0.05}MgSi_2O_6$ was thus obtained. The primary particle diameter of the obtained phosphor was not more than 1.5 $\mu$m, by measuring with a photograph of the phosphor particle by scanning electron microscope. This phosphor was irradiated by ultraviolet using exima 146 nm lamp (manufactured by Ushio Inc., H0012 type) in a vacuum vessel of 6.7 Pa ($5\times10^{-2}$ torr), and the brightness after color compensation was 18 $cd/m^2$. The color of emission was visually recognized to be blue having high color purity.

Example 2

Using silicon oxide ($SiO_2$) having BET specific surface area of 51 $m^2/g$ (manufactured by NIPPON Aerosil Co. Ltd., grade No.50), raw materials of calcium carbonate ($CaCO_3$, manufactured by Wako Pure Chemical Industries, Ltd.), strontium carbonate ($SrCO_3$, manufactured by Wako Pure Chemical Industries, Ltd.), europium oxide ($Eu_2O_3$, manufactured by Shin-Etsu Chemical Co., Ltd.), basic magnesium carbonate (($MgCO_3)_4Mg(OH)_2 \cdot 5H_2O$, (manufactured by Wako Pure Chemical Industries, Ltd.) and above $SiO_2$ were mixed so that the mole ratio of $CaCO_3$:$SrCO_3$:$Eu_2O_3$:

$(MgCO_3)_4Mg(OH)_2 \cdot 5H_2O:SiO_2$ was 0.855:0.095:0.025:0.2:2, and the resulted mixture was calcined under Ar atmosphere containing 2% by volume $H_2$, at 1200° C. for 2 hours. A phosphor compound represented by the composition formula $Ca_{0.855}Sr_{0.095}Eu_{0.05}MgSi_2O_6$ was thus obtained. The primary particle diameter of the obtained phosphor was not more than 2 μm, by measuring with a photograph of the phosphor particle by scanning electron microscope. This phosphor was irradiated by ultraviolet using exima 146 nm lamp (manufactured by Ushio Inc., H0012 type) in a vacuum vessel of 6.7 Pa ($5\times10^{-2}$ torr), and the brightness after color compensation was 17 cd/m². The color of emission was visually recognized to be blue having high color purity.

Example 3

Using a spherical silicon oxide having an average particle diameter of 0.3 μm, a BET specific surface area of 15.5 m²/g and the ratio of long diameter/short diameter of 1.0 ($SiO_2$, manufactured by Admatechs Co., Ltd.), raw materials of calcium carbonate ($CaCO_3$, manufactured by Wako Pure Chemical Industries, Ltd.), strontium carbonate ($SrCO_3$, manufactured by Wako Pure Chemical Industries, Ltd.), europium oxide ($Eu_2O_3$, manufactured by Shin-Etsu Chemical Co., Ltd.), basic magnesium carbonate (($MgCO_3)_4Mg(OH)_2 \cdot 5H_2O$, manufactured by Wako Pure Chemical Industries, Ltd.) and $SiO_2$ were mixed so that the mole ratio of $CaCO_3:SrCO_3:Eu_2O_3:(MgCO_3)_4Mg(OH)_2 \cdot 5H_2O:SiO_2$ was 0.855:0.095:0.025:0.2:2, and the mixture was calcined under Ar atmosphere containing 2% by volume $H_2$, at 1200° C. for 2 hours. A phosphor compound represented by the composition formula $Ca_{0.855}Sr_{0.095}Eu_{0.05}MgSi_2O_6$ was thus obtained. The primary particle diameter of the obtained phosphor was not more than 5 μm, by measuring with a photograph of the phosphor particles by scanning electron microscope. This phosphor was irradiated by ultraviolet using exima 146 nm lamp (manufactured by Ushio Inc., H0012 type) in a vacuum vessel of 6.7 Pa ($5\times10^{-2}$ torr), and the brightness after color compensation was 13 cd/m².

Comparative Example 1

A phosphor was prepared in a similar manner to that of Example 1 except that silicon oxide ($SiO_2$) having BET specific surface area of 0.1 m²/g (manufactured by Wako Pure Chemical Industries, Ltd., catalog No. 199-00625) was used. The brightness after color compensation which was measured in a similar manner to that of Example 1, was 9 cd/m². The color of emission was visually recognized to be greenish and deviated from pure blue.

The present invention can provide a silicate phosphor having high brightness. This silicate phosphor has high brightness under vacuum ultraviolet excitation and therefore is a preferable phosphor for a vacuum ultraviolet excitation light emission element such as a plasma display panel (PDP), a rare gas lamp and the like. The production method of the present invention is industrially useful in extreme.

What is claimed is:

1. A method for producing a silicate phosphor comprising a step of calcining a mixture of metal compounds, wherein the mixture of metal compounds comprises silicon oxide having a BET specific surface area of not less than 10 m²/g and a compound of one or more metals selected from the group consisting of Ca, Sr, Ba, Mg, Eu, Mn and Zn, and the silicate phosphor comprises a compound represented by the general formula of $mM^1O \cdot nM^2O \cdot 2SiO_2$ (wherein $M^1$ is one or more elements selected from the group consisting of Ca, Sr and Ba, $M^2$ is one or more elements selected from the group consisting of Mg and Zn, m is from 0.5 to 3.5, and n is from 0.5 to 2.5), and one or more selected from the group consisting of Eu and Mn as an activating agent.

2. The method according to claim 1, wherein BET specific surface area is not more than 400 m²/g.

3. The method according to claim 1, wherein BET specific surface area is not less than 100 m²/g.

4. The method according to claim 1, wherein the silicon oxide is spherical silicon oxide.

5. The method according to claim 4, wherein the silicon oxide has BET specific surface area of not more than 50 m²/g.

6. The method according to claim 4, wherein the ratio of longest diameter to shortest diameter of the spherical silicon oxide is from 1 to 1.5.

7. The method according to claim 6, wherein the ratio of longest diameter to shortest diameter of the spherical silicon oxide is from 1 to 1.3.

8. A silicate phosphor containing not less than 80% by weight particle having primary particle diameter of not more than 5 μm obtained by the method comprising a step of calcining a mixture of metal compounds, wherein one of the metal compounds is silicon oxide having BET specific surface area of not less than 10 m²/g, wherein the silicate phosphor comprises a compound represented by the general formula of $mM^1O \cdot nM^2O \cdot 2SiO_2$ (wherein $M^1$ is one or more elements selected from the group consisting of Ca, Sr and Ba, $M^2$ is one or more elements selected from the group consisting of Mg and Zn, m is from 0.5 to 3.5, and n is from 0.5 to 2.5), and one or more selected from the group consisting of Eu and Mn as an activating agent.

* * * * *